(12) United States Patent
Miyake

(10) Patent No.: US 7,243,144 B2
(45) Date of Patent: Jul. 10, 2007

(54) INTEGRATED TOPOLOGY MANAGEMENT METHOD FOR STORAGE AND IP NETWORKS

(75) Inventor: Shigeru Miyake, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 108 days.

(21) Appl. No.: 10/255,773

(22) Filed: Sep. 26, 2002

(65) Prior Publication Data

US 2004/0064545 A1 Apr. 1, 2004

(51) Int. Cl.
*G06F 15/173* (2006.01)

(52) U.S. Cl. .................. 709/223; 715/810; 709/224; 709/227

(58) Field of Classification Search ........... 709/223, 709/224, 227; 395/200; 715/810
See application file for complete search history.

(56) References Cited

U.S. PATENT DOCUMENTS

| | | | | |
|---|---|---|---|---|
| 5,471,399 | A * | 11/1995 | Tanaka et al. ................ | 716/11 |
| 5,768,271 | A * | 6/1998 | Seid et al. ................... | 370/389 |
| 5,793,974 | A * | 8/1998 | Messinger .................. | 709/224 |
| 5,805,816 | A * | 9/1998 | Picazo, Jr. et al. .......... | 709/223 |
| 5,850,388 | A * | 12/1998 | Anderson et al. ........... | 370/252 |
| 6,009,466 | A * | 12/1999 | Axberg et al. .............. | 709/220 |
| 6,220,768 | B1 | 4/2001 | Barroux | |
| 6,253,240 | B1 * | 6/2001 | Axberg et al. .............. | 709/223 |
| 6,311,321 | B1 | 10/2001 | Agnihotri et al. | |
| 6,363,421 | B2 * | 3/2002 | Barker et al. ............... | 709/223 |
| 6,456,306 | B1 * | 9/2002 | Chin et al. .................. | 715/810 |
| 6,907,457 | B2 * | 6/2005 | Merrell et al. .............. | 709/223 |

2002/0019908 A1 2/2002 Rueter et al.

OTHER PUBLICATIONS

"Storage Management from Trivoli," an extract from the Bloor Research Storage Management Report, Jan. 2002, 14 pages.

(Continued)

*Primary Examiner*—David Wiley
*Assistant Examiner*—Asghar Bilgrami
(74) *Attorney, Agent, or Firm*—Townsend and Townsend and Crew LLP

(57) ABSTRACT

A set of integrated management tools for managing network elements and storage elements within a computer system is provided. The set of integrated management tools includes a SNMP manager module, a management map creation module, a storage network topology information creation module, an IP storage configuration module, a FC configuration module, a RAID configuration module, and a HBA configuration module. In one exemplary aspect, these modules are deployed in a distributed manner within a networked system having a number of nodes. Each node includes an IP server farm and a storage sub-system or network, such as, a SAN. Some of the nodes respectively include a local storage management (LSM) server. Some of the modules within the set of integrated management tools reside on the LSM server. For example, the SNMP manager module, portions of the management map creation module, the storage network topology information creation module, the IP storage configuration module, the FC configuration module, the RAID configuration module, and the HBA configuration module may reside on the LSM server. One node within the networked system includes a global storage management (GSM) server. Portions of the management map creation module resides on the GSM server. The GSM server communicates with the various LSM servers to facilitate control and management of the various nodes within the networked system.

31 Claims, 18 Drawing Sheets

OTHER PUBLICATIONS

"Ventana ™ SAN Manager 3.0," Gadzoox Networks, Inc. Legal Notices, 2000, 9 pages.

Oxenhandler, Brett, et al., "Managing Multivendor SANs with SAN InSite 2000." Vixel Corporation, Mar. 2000, 7 pages.

Wilson, Steven, "Managing a Fibre Channel Storage Area Network," Storage Networking Industry Association, Nov. 29, 1998, 12 pages.

* cited by examiner

```xml
- <MDCML TS="1014068331420" VERSION="1.0">
  - <DEVICE AVAILABLE="1" GUID="PROTOTYPE_HitachiRaid_Demo8" IBSTAT="0"
    NAME="PROTOTYPE_HitachiRaid_Demo8" OBSTAT="0" TYPE="2716">
    <PGROUP COUNT="100" />
    - <PROPCOLL>
        <PROP NAME="IsPlannedDevice" WR="1">TRUE</PROP>
        <PROP NAME="IPAddress" WR="1">192.168.1.8</PROP>
        <PROP NAME="DeviceType" WR="1">2716</PROP>
        <PROP NAME="Position" WR="1">100,30</PROP>
        <PROP NAME="Show In Layout" WR="1">1</PROP>
      </PROPCOLL>
    </DEVICE>
  - <DEVICE AVAILABLE="1" GUID="PROTOTYPE_Router_Demo10" IBSTAT="0"
    NAME="PROTOTYPE_Router_Demo10" OBSTAT="0" TYPE="2720">
    <PGROUP COUNT="100" />
    - <PROPCOLL>
        <PROP NAME="IsPlannedDevice" WR="1">TRUE</PROP>
        <PROP NAME="IPAddress" WR="1">192.168.1.10</PROP>
        <PROP NAME="DeviceType" WR="1">2720</PROP>
        <PROP NAME="Position" WR="1">170,30</PROP>
        <PROP NAME="Show In Layout" WR="1">1</PROP>
      </PROPCOLL>
    </DEVICE>
  - <DEVICE AVAILABLE="1" GUID="PROTOTYPE_Cisco_Demo4" IBSTAT="0"
    NAME="PROTOTYPE_Cisco_Demo4" OBSTAT="0" TYPE="2717">
    <PGROUP COUNT="100" />
    - <PROPCOLL>
        <PROP NAME="IsPlannedDevice" WR="1">TRUE</PROP>
        <PROP NAME="IPAddress" WR="1">192.168.1.4</PROP>
        <PROP NAME="DeviceType" WR="1">2717</PROP>
        <PROP NAME="Position" WR="1">240,30</PROP>
        <PROP NAME="Show In Layout" WR="1">1</PROP>
      </PROPCOLL>
    </DEVICE>
  - <DEVICE AVAILABLE="1" GUID="PROTOTYPE_PCWithHba_Demo7" IBSTAT="0"
    NAME="PROTOTYPE_PCWithHba_Demo7" OBSTAT="0" TYPE="2713">
    <PGROUP COUNT="100" />
    - <PROPCOLL>
        <PROP NAME="IsPlannedDevice" WR="1">TRUE</PROP>
        <PROP NAME="IPAddress" WR="1">192.168.1.7</PROP>
        <PROP NAME="DeviceType" WR="1">2713</PROP>
        <PROP NAME="Position" WR="1">310,30</PROP>
        <PROP NAME="Show In Layout" WR="1">1</PROP>
      </PROPCOLL>
    </DEVICE>
  - <DEVICE AVAILABLE="1" GUID="PROTOTYPE_Cisco_Demo3" IBSTAT="0"
    NAME="PROTOTYPE_Cisco_Demo3" OBSTAT="0" TYPE="2717">
    <PGROUP COUNT="100" />
    - <PROPCOLL>
        <PROP NAME="IsPlannedDevice" WR="1">TRUE</PROP>
        <PROP NAME="IPAddress" WR="1">192.168.1.3</PROP>
        <PROP NAME="DeviceType" WR="1">2717</PROP>
```

Fig. 5A

```xml
      <PROP NAME="Position" WR="1">380,30</PROP>
      <PROP NAME="Show In Layout" WR="1">1</PROP>
    </PROPCOLL>
  </DEVICE>
- <DEVICE AVAILABLE="1" GUID="PROTOTYPE_Cisco_Demo2" IBSTAT="0"
    NAME="PROTOTYPE_Cisco_Demo2" OBSTAT="0" TYPE="2717">
    <PGROUP COUNT="100" />
  - <PROPCOLL>
      <PROP NAME="IsPlannedDevice" WR="1">TRUE</PROP>
      <PROP NAME="IPAddress" WR="1">192.168.1.2</PROP>
      <PROP NAME="DeviceType" WR="1">2717</PROP>
      <PROP NAME="Position" WR="1">450,30</PROP>
      <PROP NAME="Show In Layout" WR="1">1</PROP>
    </PROPCOLL>
  </DEVICE>
- <DEVICE AVAILABLE="1" GUID="PROTOTYPE_PC_Demo6" IBSTAT="0"
    NAME="PROTOTYPE_PC_Demo6" OBSTAT="0" TYPE="2714">
    <PGROUP COUNT="100" />
  - <PROPCOLL>
      <PROP NAME="IsPlannedDevice" WR="1">TRUE</PROP>
      <PROP NAME="IPAddress" WR="1">192.168.1.6</PROP>
      <PROP NAME="DeviceType" WR="1">2714</PROP>
      <PROP NAME="Position" WR="1">520,30</PROP>
      <PROP NAME="Show In Layout" WR="1">1</PROP>
    </PROPCOLL>
  </DEVICE>
- <DEVICE AVAILABLE="1" GUID="PROTOTYPE_Brocade_Demo4" IBSTAT="0"
    NAME="PROTOTYPE_Brocade_Demo4" OBSTAT="0" TYPE="2715">
    <PGROUP COUNT="100" />
  - <PROPCOLL>
      <PROP NAME="IsPlannedDevice" WR="1">TRUE</PROP>
      <PROP NAME="IPAddress" WR="1">192.168.1.5</PROP>
      <PROP NAME="DeviceType" WR="1">2715</PROP>
      <PROP NAME="Position" WR="1">100,130</PROP>
      <PROP NAME="Show In Layout" WR="1">1</PROP>
    </PROPCOLL>
  </DEVICE>
- <DEVICE AVAILABLE="1" GUID="Brocade_192.168.1.101" IBSTAT="0"
    NAME="Brocade_192.168.1.101" OBSTAT="0" TYPE="2715">
    <PGROUP COUNT="100" />
  - <PROPCOLL>
      <PROP NAME="IsPlannedDevice" WR="1">TRUE</PROP>
      <PROP NAME="IPAddress" WR="1">192.168.1.101</PROP>
      <PROP NAME="DeviceType" WR="1">2715</PROP>
      <PROP NAME="Position" WR="1">170,130</PROP>
      <PROP NAME="Show In Layout" WR="1">1</PROP>
    </PROPCOLL>
  </DEVICE>
- <DEVICE AVAILABLE="1" GUID="PROTOTYPE_Brocade_Demo1" IBSTAT="0"
    NAME="PROTOTYPE_Brocade_Demo1" OBSTAT="0" TYPE="2715">
    <PGROUP COUNT="100" />
  - <PROPCOLL>
```

Fig. 5B

```
   <PROP NAME="IsPlannedDevice" WR="1">TRUE</PROP>
   <PROP NAME="IPAddress" WR="1">192.168.1.1</PROP>
   <PROP NAME="DeviceType" WR="1">2715</PROP>
   <PROP NAME="Position" WR="1">240,130</PROP>
   <PROP NAME="Show In Layout" WR="1">1</PROP>
  </PROPCOLL>
 </DEVICE>
- <DEVICE AVAILABLE="1" GUID="PROTOTYPE_Router_Demo9" IBSTAT="0"
   NAME="PROTOTYPE_Router_Demo9" OBSTAT="0" TYPE="2720">
   <PGROUP COUNT="100" />
 - <PROPCOLL>
   <PROP NAME="IsPlannedDevice" WR="1">TRUE</PROP>
   <PROP NAME="IPAddress" WR="1">192.168.1.9</PROP>
   <PROP NAME="DeviceType" WR="1">2720</PROP>
   <PROP NAME="Position" WR="1">310,130</PROP>
   <PROP NAME="Show In Layout" WR="1">1</PROP>
  </PROPCOLL>
 </DEVICE>
</MDCML>
```

Fig. 5C

```xml
- <MDCML TS="1014068331510" VERSION="1.0">
  - <DEVICE AVAILABLE="1" GUID="PROTOTYPE_Brocade_Demo4" IBSTAT="0"
     NAME="PROTOTYPE_Brocade_Demo4" OBSTAT="0" TYPE="2715">
    - <PGROUP COUNT="100">
      - <PORT NUM="0" TYPE="0">
          <CONN STAT="1" TGUID="PROTOTYPE_HitachiRaid_Demo8"
            TPORT="0" TTYPE="0" />
        </PORT>
      - <PORT NUM="4" TYPE="0">
          <CONN STAT="1" TGUID="Brocade_192.168.1.101" TPORT="0"
            TTYPE="0" />
        </PORT>
      - <PORT NUM="8" TYPE="0">
          <CONN STAT="1" TGUID="PROTOTYPE_Cisco_Demo3" TPORT="0"
            TTYPE="0" />
        </PORT>
      - <PORT NUM="12" TYPE="0">
          <CONN STAT="1" TGUID="PROTOTYPE_PCWithHba_Demo7"
            TPORT="0" TTYPE="0" />
        </PORT>
      </PGROUP>
    - <PROPCOLL>
        <PROP NAME="IsPlannedDevice" WR="1">TRUE</PROP>
        <PROP NAME="IPAddress" WR="1">192.168.1.5</PROP>
        <PROP NAME="DeviceType" WR="1">2715</PROP>
        <PROP NAME="Position" WR="1">100,30</PROP>
        <PROP NAME="Show In Layout" WR="1">1</PROP>
      </PROPCOLL>
    </DEVICE>
    <DEVICE AVAILABLE="1" GUID="PROTOTYPE_HitachiRaid_Demo8" IBSTAT="0"
      NAME="PROTOTYPE_HitachiRaid_Demo8" OBSTAT="0" TYPE="2716">
    - <PGROUP COUNT="100">
      - <PORT NUM="0" TYPE="0">
          <CONN STAT="1" TGUID="PROTOTYPE_Brocade_Demo4" TPORT="0"
            TTYPE="0" />
        </PORT>
      - <PORT NUM="16" TYPE="0">
          <CONN STAT="1" TGUID="PROTOTYPE_HitachiRaid_Demo8"
            TPORT="0" TTYPE="0" />
        </PORT>
      - <PORT NUM="0" TYPE="0">
          <CONN STAT="1" TGUID="PROTOTYPE_HitachiRaid_Demo8"
            TPORT="16" TTYPE="0" />
        </PORT>
      - <PORT NUM="20" TYPE="0">
          <CONN STAT="1" TGUID="Brocade_192.168.1.101" TPORT="0"
            TTYPE="0" />
        </PORT>
      - <PORT NUM="24" TYPE="0">
          <CONN STAT="1" TGUID="PROTOTYPE_Cisco_Demo3" TPORT="0"
            TTYPE="0" />
        </PORT>
      - <PORT NUM="28" TYPE="0">
```

Fig 6A

```xml
      <CONN STAT="1" TGUID="PROTOTYPE_PCWithHba_Demo7"
        TPORT="0" TTYPE="0" />
    </PORT>
  - <PORT NUM="0" TYPE="0">
      <CONN STAT="1" TGUID="PROTOTYPE_Brocade_Demo1" TPORT="32"
        TTYPE="0" />
    </PORT>
  - <PORT NUM="0" TYPE="0">
      <CONN STAT="1" TGUID="Brocade_192.168.1.101" TPORT="48"
        TTYPE="0" />
    </PORT>
  - <PORT NUM="0" TYPE="0">
      <CONN STAT="1" TGUID="PROTOTYPE_Cisco_Demo4" TPORT="64"
        TTYPE="0" />
    </PORT>
  - <PORT NUM="0" TYPE="0">
      <CONN STAT="1" TGUID="PROTOTYPE_Cisco_Demo3" TPORT="80"
        TTYPE="0" />
    </PORT>
  - <PORT NUM="0" TYPE="0">
      <CONN STAT="1" TGUID="PROTOTYPE_Cisco_Demo2" TPORT="96"
        TTYPE="0" />
    </PORT>
  - <PORT NUM="0" TYPE="0">
      <CONN STAT="1" TGUID="PROTOTYPE_PCWithHba_Demo7"
        TPORT="112" TTYPE="0" />
    </PORT>
  </PGROUP>
- <PROPCOLL>
    <PROP NAME="IsPlannedDevice" WR="1">TRUE</PROP>
    <PROP NAME="IPAddress" WR="1">192.168.1.8</PROP>
    <PROP NAME="DeviceType" WR="1">2716</PROP>
    <PROP NAME="Position" WR="1">170,30</PROP>
    <PROP NAME="Show In Layout" WR="1">1</PROP>
  </PROPCOLL>
</DEVICE>
- <DEVICE AVAILABLE="1" GUID="PROTOTYPE_Brocade_Demo1" IBSTAT="0"
    NAME="PROTOTYPE_Brocade_Demo1" OBSTAT="0" TYPE="2715">
  - <PGROUP COUNT="100">
    - <PORT NUM="32" TYPE="0">
        <CONN STAT="1" TGUID="PROTOTYPE_HitachiRaid_Demo8"
          TPORT="0" TTYPE="0" />
      </PORT>
    - <PORT NUM="36" TYPE="0">
        <CONN STAT="1" TGUID="Brocade_192.168.1.101" TPORT="0"
          TTYPE="0" />
      </PORT>
    - <PORT NUM="40" TYPE="0">
        <CONN STAT="1" TGUID="PROTOTYPE_Cisco_Demo3" TPORT="0"
          TTYPE="0" />
      </PORT>
    - <PORT NUM="44" TYPE="0">
        <CONN STAT="1" TGUID="PROTOTYPE_PCWithHba_Demo7"
```

Fig. 6B

```xml
        TPORT="0" TTYPE="0" />
      </PORT>
    </PGROUP>
  - <PROPCOLL>
      <PROP NAME="IsPlannedDevice" WR="1">TRUE</PROP>
      <PROP NAME="IPAddress" WR="1">192.168.1.1</PROP>
      <PROP NAME="DeviceType" WR="1">2715</PROP>
      <PROP NAME="Position" WR="1">240,30</PROP>
      <PROP NAME="Show In Layout" WR="1">1</PROP>
    </PROPCOLL>
  </DEVICE>
- <DEVICE AVAILABLE="1" GUID="Brocade_192.168.1.101" IBSTAT="0"
    NAME="Brocade_192.168.1.101" OBSTAT="0" TYPE="2715">
  - <PGROUP COUNT="100">
    - <PORT NUM="0" TYPE="0">
        <CONN STAT="1" TGUID="PROTOTYPE_Brocade_Demo4" TPORT="4"
          TTYPE="0" />
      </PORT>
    - <PORT NUM="0" TYPE="0">
        <CONN STAT="1" TGUID="PROTOTYPE_HitachiRaid_Demo8"
          TPORT="20" TTYPE="0" />
      </PORT>
    - <PORT NUM="0" TYPE="0">
        <CONN STAT="1" TGUID="PROTOTYPE_Brocade_Demo1" TPORT="36"
          TTYPE="0" />
      </PORT>
    - <PORT NUM="48" TYPE="0">
        <CONN STAT="1" TGUID="PROTOTYPE_HitachiRaid_Demo8"
          TPORT="0" TTYPE="0" />
      </PORT>
    - <PORT NUM="52" TYPE="0">
        <CONN STAT="1" TGUID="Brocade_192.168.1.101" TPORT="0"
          TTYPE="0" />
      </PORT>
    - <PORT NUM="0" TYPE="0">
        <CONN STAT="1" TGUID="Brocade_192.168.1.101" TPORT="52"
          TTYPE="0" />
      </PORT>
    - <PORT NUM="56" TYPE="0">
        <CONN STAT="1" TGUID="PROTOTYPE_Cisco_Demo3" TPORT="0"
          TTYPE="0" />
      </PORT>
    - <PORT NUM="60" TYPE="0">
        <CONN STAT="1" TGUID="PROTOTYPE_PCWithHba_Demo7"
          TPORT="0" TTYPE="0" />
      </PORT>
    - <PORT NUM="0" TYPE="0">
        <CONN STAT="1" TGUID="PROTOTYPE_Cisco_Demo4" TPORT="68"
          TTYPE="0" />
      </PORT>
    - <PORT NUM="0" TYPE="0">
        <CONN STAT="1" TGUID="PROTOTYPE_Cisco_Demo3" TPORT="84"
          TTYPE="0" />
```

Fig. 6C

```xml
        </PORT>
      - <PORT NUM="0" TYPE="0">
          <CONN STAT="1" TGUID="PROTOTYPE_Cisco_Demo2" TPORT="100"
            TTYPE="0" />
        </PORT>
      - <PORT NUM="0" TYPE="0">
          <CONN STAT="1" TGUID="PROTOTYPE_PCWithHba_Demo7"
            TPORT="116" TTYPE="0" />
        </PORT>
      </PGROUP>
    - <PROPCOLL>
        <PROP NAME="IsPlannedDevice" WR="1">TRUE</PROP>
        <PROP NAME="IPAddress" WR="1">192.168.1.101</PROP>
        <PROP NAME="DeviceType" WR="1">2715</PROP>
        <PROP NAME="Position" WR="1">310,30</PROP>
        <PROP NAME="Show In Layout" WR="1">1</PROP>
      </PROPCOLL>
    </DEVICE>
  - <DEVICE AVAILABLE="1" GUID="PROTOTYPE_Cisco_Demo4" IBSTAT="0"
      NAME="PROTOTYPE_Cisco_Demo4" OBSTAT="0" TYPE="2717">
    - <PGROUP COUNT="100">
      - <PORT NUM="64" TYPE="0">
          <CONN STAT="1" TGUID="PROTOTYPE_HitachiRaid_Demo8"
            TPORT="0" TTYPE="0" />
        </PORT>
      - <PORT NUM="68" TYPE="0">
          <CONN STAT="1" TGUID="Brocade_192.168.1.101" TPORT="0"
            TTYPE="0" />
        </PORT>
      - <PORT NUM="72" TYPE="0">
          <CONN STAT="1" TGUID="PROTOTYPE_Cisco_Demo3" TPORT="0"
            TTYPE="0" />
        </PORT>
      - <PORT NUM="76" TYPE="0">
          <CONN STAT="1" TGUID="PROTOTYPE_PCWithHba_Demo7"
            TPORT="0" TTYPE="0" />
        </PORT>
      </PGROUP>
    - <PROPCOLL>
        <PROP NAME="IsPlannedDevice" WR="1">TRUE</PROP>
        <PROP NAME="IPAddress" WR="1">192.168.1.4</PROP>
        <PROP NAME="DeviceType" WR="1">2717</PROP>
        <PROP NAME="Position" WR="1">380,30</PROP>
        <PROP NAME="Show In Layout" WR="1">1</PROP>
      </PROPCOLL>
    </DEVICE>
  - <DEVICE AVAILABLE="1" GUID="PROTOTYPE_Cisco_Demo3" IBSTAT="0"
      NAME="PROTOTYPE_Cisco_Demo3" OBSTAT="0" TYPE="2717">
    - <PGROUP COUNT="100">
      - <PORT NUM="0" TYPE="0">
          <CONN STAT="1" TGUID="PROTOTYPE_Brocade_Demo4" TPORT="8"
            TTYPE="0" />
        </PORT>
```

Fig. 6D

```xml
- <PORT NUM="0" TYPE="0">
    <CONN STAT="1" TGUID="PROTOTYPE_HitachiRaid_Demo8"
      TPORT="24" TTYPE="0" />
  </PORT>
- <PORT NUM="0" TYPE="0">
    <CONN STAT="1" TGUID="PROTOTYPE_Brocade_Demo1" TPORT="40"
      TTYPE="0" />
  </PORT>
- <PORT NUM="0" TYPE="0">
    <CONN STAT="1" TGUID="Brocade_192.168.1.101" TPORT="56"
      TTYPE="0" />
  </PORT>
- <PORT NUM="0" TYPE="0">
    <CONN STAT="1" TGUID="PROTOTYPE_Cisco_Demo4" TPORT="72"
      TTYPE="0" />
  </PORT>
- <PORT NUM="80" TYPE="0">
    <CONN STAT="1" TGUID="PROTOTYPE_HitachiRaid_Demo8"
      TPORT="0" TTYPE="0" />
  </PORT>
- <PORT NUM="84" TYPE="0">
    <CONN STAT="1" TGUID="Brocade_192.168.1.101" TPORT="0"
      TTYPE="0" />
  </PORT>
- <PORT NUM="88" TYPE="0">
    <CONN STAT="1" TGUID="PROTOTYPE_Cisco_Demo3" TPORT="0"
      TTYPE="0" />
  </PORT>
- <PORT NUM="0" TYPE="0">
    <CONN STAT="1" TGUID="PROTOTYPE_Cisco_Demo3" TPORT="88"
      TTYPE="0" />
  </PORT>
- <PORT NUM="92" TYPE="0">
    <CONN STAT="1" TGUID="PROTOTYPE_PCWithHba_Demo7"
      TPORT="0" TTYPE="0" />
  </PORT>
- <PORT NUM="0" TYPE="0">
    <CONN STAT="1" TGUID="PROTOTYPE_Cisco_Demo2" TPORT="104"
      TTYPE="0" />
  </PORT>
- <PORT NUM="0" TYPE="0">
    <CONN STAT="1" TGUID="PROTOTYPE_PCWithHba_Demo7"
      TPORT="120" TTYPE="0" />
  </PORT>
  </PGROUP>
- <PROPCOLL>
    <PROP NAME="IsPlannedDevice" WR="1">TRUE</PROP>
    <PROP NAME="IPAddress" WR="1">192.168.1.3</PROP>
    <PROP NAME="DeviceType" WR="1">2717</PROP>
    <PROP NAME="Position" WR="1">450,30</PROP>
    <PROP NAME="Show In Layout" WR="1">1</PROP>
  </PROPCOLL>
</DEVICE>
```

Fig. 6E

```xml
<DEVICE AVAILABLE="1" GUID="PROTOTYPE_Cisco_Demo2" IBSTAT="0"
  NAME="PROTOTYPE_Cisco_Demo2" OBSTAT="0" TYPE="2717">
- <PGROUP COUNT="100">
  - <PORT NUM="96" TYPE="0">
      <CONN STAT="1" TGUID="PROTOTYPE_HitachiRaid_Demo8"
        TPORT="0" TTYPE="0" />
    </PORT>
  - <PORT NUM="100" TYPE="0">
      <CONN STAT="1" TGUID="Brocade_192.168.1.101" TPORT="0"
        TTYPE="0" />
    </PORT>
  - <PORT NUM="104" TYPE="0">
      <CONN STAT="1" TGUID="PROTOTYPE_Cisco_Demo3" TPORT="0"
        TTYPE="0" />
    </PORT>
  - <PORT NUM="108" TYPE="0">
      <CONN STAT="1" TGUID="PROTOTYPE_PCWithHba_Demo7"
        TPORT="0" TTYPE="0" />
    </PORT>
  </PGROUP>
- <PROPCOLL>
    <PROP NAME="IsPlannedDevice" WR="1">TRUE</PROP>
    <PROP NAME="IPAddress" WR="1">192.168.1.2</PROP>
    <PROP NAME="DeviceType" WR="1">2717</PROP>
    <PROP NAME="Position" WR="1">520,30</PROP>
    <PROP NAME="Show In Layout" WR="1">1</PROP>
  </PROPCOLL>
</DEVICE>
- <DEVICE AVAILABLE="1" GUID="PROTOTYPE_PCWithHba_Demo7" IBSTAT="0"
  NAME="PROTOTYPE_PCWithHba_Demo7" OBSTAT="0" TYPE="2713">
- <PGROUP COUNT="100">
  - <PORT NUM="0" TYPE="0">
      <CONN STAT="1" TGUID="PROTOTYPE_Brocade_Demo4" TPORT="12"
        TTYPE="0" />
    </PORT>
  - <PORT NUM="0" TYPE="0">
      <CONN STAT="1" TGUID="PROTOTYPE_HitachiRaid_Demo8"
        TPORT="28" TTYPE="0" />
    </PORT>
  - <PORT NUM="0" TYPE="0">
      <CONN STAT="1" TGUID="PROTOTYPE_Brocade_Demo1" TPORT="44"
        TTYPE="0" />
    </PORT>
  - <PORT NUM="0" TYPE="0">
      <CONN STAT="1" TGUID="Brocade_192.168.1.101" TPORT="60"
        TTYPE="0" />
    </PORT>
  - <PORT NUM="0" TYPE="0">
      <CONN STAT="1" TGUID="PROTOTYPE_Cisco_Demo4" TPORT="76"
        TTYPE="0" />
    </PORT>
  - <PORT NUM="0" TYPE="0">
      <CONN STAT="1" TGUID="PROTOTYPE_Cisco_Demo3" TPORT="92"
```

Fig. 6F

```
        TTYPE="0" />
      </PORT>
    - <PORT NUM="0" TYPE="0">
        <CONN STAT="1" TGUID="PROTOTYPE_Cisco_Demo2" TPORT="108"
          TTYPE="0" />
      </PORT>
    - <PORT NUM="112" TYPE="0">
        <CONN STAT="1" TGUID="PROTOTYPE_HitachiRaid_Demo8"
          TPORT="0" TTYPE="0" />
      </PORT>
    - <PORT NUM="116" TYPE="0">
        <CONN STAT="1" TGUID="Brocade_192.168.1.101" TPORT="0"
          TTYPE="0" />
      </PORT>
    - <PORT NUM="120" TYPE="0">
        <CONN STAT="1" TGUID="PROTOTYPE_Cisco_Demo3" TPORT="0"
          TTYPE="0" />
      </PORT>
    - <PORT NUM="124" TYPE="0">
        <CONN STAT="1" TGUID="PROTOTYPE_PCWithHba_Demo7"
          TPORT="0" TTYPE="0" />
      </PORT>
    - <PORT NUM="0" TYPE="0">
        <CONN STAT="1" TGUID="PROTOTYPE_PCWithHba_Demo7"
          TPORT="124" TTYPE="0" />
      </PORT>
    </PGROUP>
  - <PROPCOLL>
      <PROP NAME="IsPlannedDevice" WR="1">TRUE</PROP>
      <PROP NAME="IPAddress" WR="1">192.168.1.7</PROP>
      <PROP NAME="DeviceType" WR="1">2713</PROP>
      <PROP NAME="Position" WR="1">100,130</PROP>
      <PROP NAME="Show In Layout" WR="1">1</PROP>
    </PROPCOLL>
  </DEVICE>
</MDCML>
```

Fig. 6G

INTEGRATED TOPOLOGY MANAGEMENT METHOD FOR STORAGE AND IP NETWORKS

CROSS-REFERENCES TO RELATED APPLICATION(S)

The present application is related to co-pending, commonly assigned and owned U.S. patent application Ser. No. 10/255,749 entitled "RESOURCE DISTRIBUTION MANAGEMENT METHOD OVER INTER-NETWORKS", filed concurrently herewith, the disclosure of which is hereby incorporated by reference in its entirety for all purposes.

BACKGROUND OF THE INVENTION

The present invention generally relates to storage area networks. More specifically, the present invention relates to methods and systems for managing storage area and IP networks in an integrated manner.

In a typical computer system, network management and storage management are usually performed separately by different sets of dedicated management tools. System administrators, especially those who are in charge of network management, have to understand and recognize all the connections between network nodes including routers, switches, servers, client PCs and storage nodes. While network management tools are generally available for IP networks, these tools cannot be used to manage networks that do not utilize IP protocol. Such network management tools typically can be used to perform various network management functions, such as, displaying the topology of a network for purposes of managing the network faults and configurations and showing the network topology regarding physical connections in multi-windows.

With respect to storage management, a storage sub-system is typically attached to and controlled by a server computer. Management of the storage sub-system has generally been subsumed as one of the many management functions performed by the server computer. As a result, storage management, such as, data management functions, is typically supported by most system management tools utilized by the server computer. Typical storage management tools can only manage storage and fiber channel network port connections. Until recently, management of the storage sub-system has been limited locally to within a computer system. That is because elements of the storage sub-system are not distributed over multiple computer networks. Other management functions regarding device management, however, have not been provided by most system management tools.

Due to the continued proliferation of information at different geographic locations, information is increasingly stored on a distributed basis thereby leading to the development of storage area networks (SANs). SANs allow information stored at distributed locations to be shared over computer networks. SAN management tools have been developed and are available to manage SANs. However, these SAN management tools primarily provide functions for managing storage related devices, such as, disk arrays (RAID), fibre channel adapters and fabric switch equipment.

In addition, new transport protocols, such as, SCSI over IP (iSCSI), Fibre Channel over IP (FCIP) and internet Fibre Channel Protocol (iFCP) have been recently developed to further enable and facilitate implementation of SANs. So far, management tools for Fibre Channel networks have been developed in order to manage the configuration of Fibre Channel switch equipment. Also, management information definitions for iSCSI and iFCP have been published as draft standard documents by the Internet Engineering Task Force (IETF) and the Storage Networking Industry Association (SNIA). These block transport based protocol over TCP/IP are suitable for data communication network among servers and storage devices. Since these recently developed protocols are stacked over the IP protocol, new management method is needed in order to manage an environment that utilizes a mixture of regular IP protocol and these new protocols over IP.

Hence, it would be desirable to have a method and system that is capable of providing network and storage management in an integrated manner in an environment that utilize IP based networks, storage area networks and some hybrid protocol-based networks, such as, iSCSI. From the viewpoint of system operation and management, it would be desirable to incorporate storage sub-systems including RAID and SANs into the overall system management operations, especially IP network management operations, since IP network provides global interoperability for large scale computer systems.

SUMMARY OF THE INVENTION

An exemplary embodiment of the present invention is a set of integrated management tools that is capable of providing integrated management of IP network nodes and storage network nodes, such as, a SAN.

According to one exemplary embodiment, the set of integrated management tools is implemented using software in a modular manner. More specifically, the set of integrated management tools includes a number of modules including a SNMP manager module, a management map creation module, a storage network topology information creation module, an IP storage configuration module, a FC configuration module, a RAID configuration module, and a HBA configuration module.

The SNMP manager module is responsible for carrying out various SNMP (simple network management protocol) functions, such as, handling SNMP packets and MIB (management information base) contents acquired from managed objects.

The management map creation module is responsible for managing various network or node mapping functions, such as, creating, storing and displaying the given topology information of a network or node.

The storage network topology information creation module is responsible for creating and managing storage device specific network information. For example, network information that relates to specific protocols, such as, Fibre Channel and iSCSI, for different storage devices can be created and managed by this module.

The IP storage configuration module is responsible for managing information relating to IP storage configuration. For example, this module can be used to change or query IP storage configuration relating to a network or node.

The FC configuration module is responsible for managing information relating to FC (Fibre Channel) storage configuration. For example, this module can be used to change or query the FC storage configuration relating to a network or node.

The RAID configuration module is responsible for managing information relating to RAID (redundant arrays of inexpensive disks) device configuration. For example, this module can be used to change or query the RAID device configuration relating to a network or node.

The HBA configuration module is responsible for managing information relating to HBA (host bus adapter) device configuration. For example, this module can be used to change or query the HBA and client device configuration relating to a network or node.

In one exemplary embodiment, these modules are deployed in a distributed manner within a networked system having a number of nodes. Each node includes an IP server farm and a storage sub-system or network, such as, a SAN. Some of the nodes respectively include a local storage management (LSM) server. Some of the modules within the set of integrated management tools reside on the LSM server. For example, the SNMP manager module, portions of the management map creation module, the storage network topology information creation module, the IP storage configuration module, the FC configuration module, the RAID configuration module, and the HBA configuration module may reside on the LSM server. One node within the networked system includes a global storage management (GSM) server. Portions of the management map creation module resides on the GSM server. The GSM server communicates with the various LSM servers to facilitate control and management of the various nodes.

The present invention can be generally used for managing network oriented systems with networked storage sub-systems for handling large volumes of data. For example, the present invention can be used by data centers, enterprise information infrastructures and storage service providers to facilitate handling and storage of voluminous amount of data across the entire system. Using the present invention, system administrators can reduce the cost of system and network operations significantly, especially the cost of managing operations related to networked storage with multiple storage-related protocols. Based on the disclosure and teachings provided herein, a person of ordinary skill in the art will realize other applications, advantages, and benefits of the present invention.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIGS. 5A-C illustrate exemplary types of device and topology information that is forwarded by a LSM server to a GSM server in accordance with the present invention;

FIGS. 6A-G illustrate additional exemplary types of device and topology information that forwarded by a LSM server to a GSM server in accordance with the present invention;

DETAILED DESCRIPTION OF THE INVENTION

Figure 1:
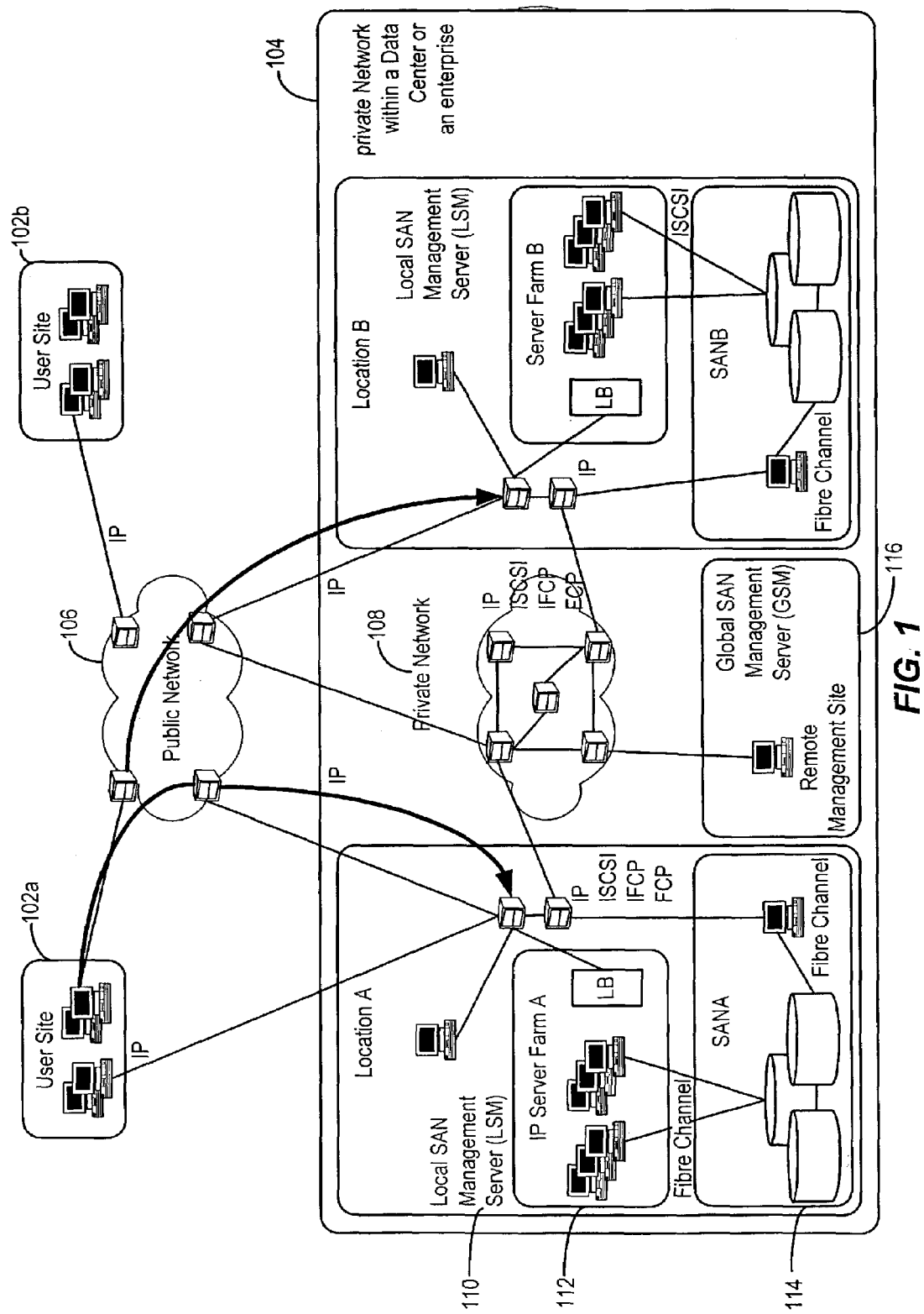
FIG. 1 is a simplified schematic diagram illustrating an exemplary embodiment in accordance with the present invention.

The present invention in the form of one or more exemplary embodiments will now be described. FIG. 1 shows an exemplary embodiment of a system 100 in accordance with the present invention. Referring to FIG. 1, the system 100 includes a number of user/client sites 102a and 102b and a back-end system 104. The client sites 102a and 102b are able to communicate with the back-end system 104 via either a public computer network 106, such as, the Internet, or a direct link, such as, a dialup connection.

In one exemplary embodiment, the back-end system 104 is a private network system managed by a data center or an enterprise IT management division within a company. The back-end system 104 is a distributed system that further includes groups of components or devices located at various different geographical locations. For example, location A may include a group of components. The group of components includes a local storage management (LSM) server 110, an IP network node including a server farm 112, and a storage network node including a SAN 114. At location A, the LSM server 110 is responsible for managing the server farm 112 and the SAN 114 within that location. The group of components may further include other computing elements or devices that are used to facilitate communications with other external devices, such as, the user/client site 102a. Likewise, location B may include a similar group of components providing similar functionality.

These different groups of components at various locations communicate with one another via a private computer network 108. The communications via the private computer network 108 are controlled by a global storage management (GSM) server 116. Generally, the GSM server 116 is located in a location that is different from the LSM servers 110. However, it should be noted that the GSM server 116 may also be located in the same location as one of the LSM servers 110. The functions of the GSM server 116 and the LSM servers 110 and their interactions will be further described below.

Within the back-end system 104, many types and layers of protocols, such as, Fibre Channel, IP and iSCSI, may be used concurrently to implement different parts of the back-end system 104.

Figure 2:
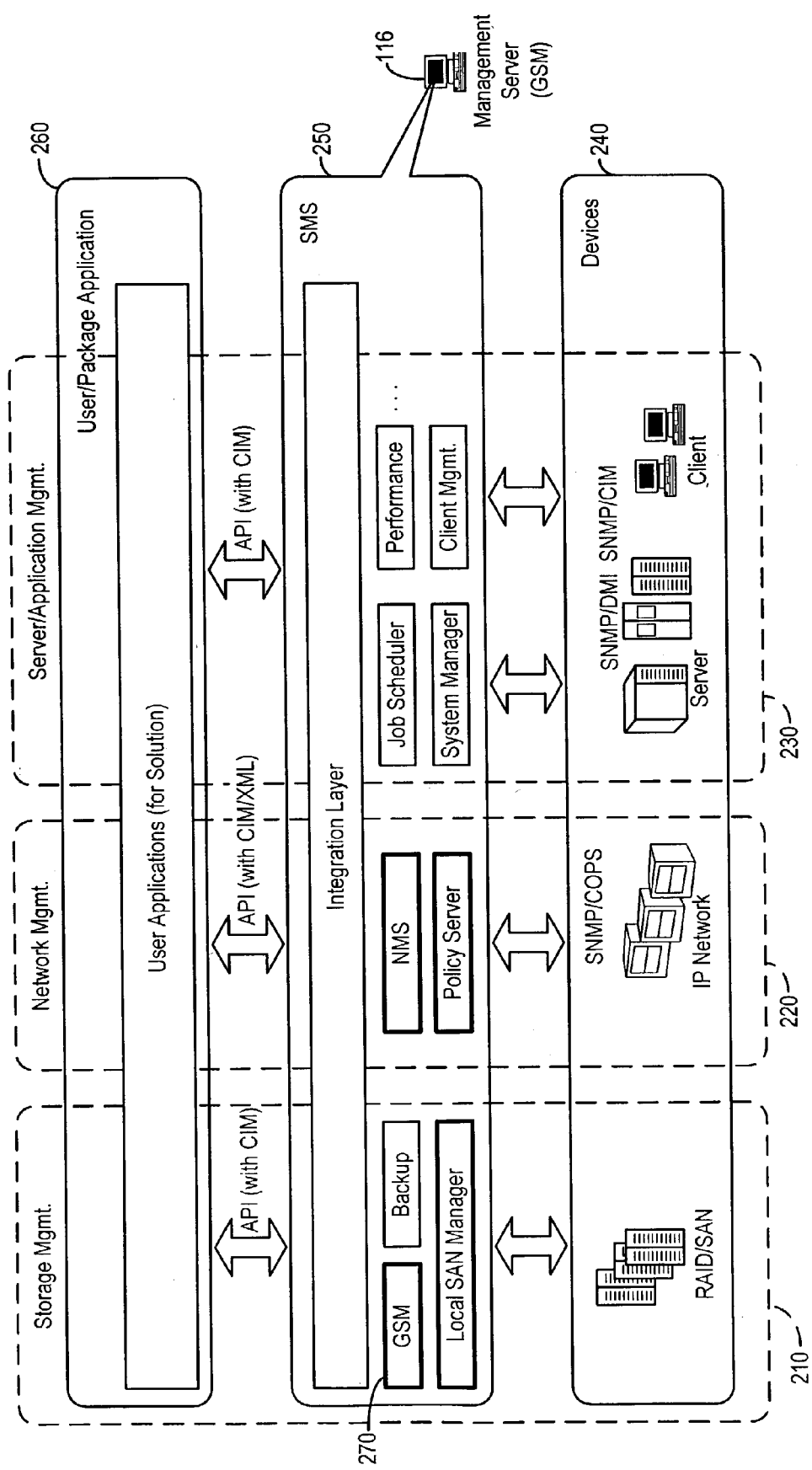
FIG. 2 is a simplified schematic diagram illustrating an exemplary conceptual architecture of the integrated system management tools in accordance with the present invention.

FIG. 2 illustrates an exemplary conceptual architecture of the integrated system management tools in accordance with the present invention. The integrated system management tools can be used to manage different aspects of the back-end system 104, including storage management, network management and server/application management.

From another perspective, the integrated management tools can be viewed as having three layers, namely, a device layer 240, a systems management systems (SMS) layer 250, and a package application layer 260.

The device layer 240 includes target devices or components that are treated by the integrated management tools as managed objects. For example, the integrated system management tools can be used to manage various types of devices or components within the back-end system 104. These various types of devices or components include, for example, servers and clients 230, IP network nodes 220 and storage nodes 210 such as RAID and SAN nodes.

The SMS layer is responsible for collecting device information from all devices or components within the device layer 240 as well as the topology (or connection) information relating to each device. The device information includes different types of information including, for example, device identification information and device utilization information. For instance, the device information for a specific device may indicate that the device is a SAN having a current utilized capacity of 50% and the topology information may indicate how the SAN is connected to a server farm, for example, via Fibre Channel protocol. Based on the disclosure provided herein, a person of ordinary skill in the art will know of the different types of information that can be included as part of the device and topology information. The SMS layer further includes an integration layer 270. The integration layer 270 is responsible for integrating all the device and topology information and providing the management functions to facilitate management of all the devices across the entire system based on the integrated device and topology information. For example, if a client wishes to access a particular server within a server farm, the integration layer 270 utilizing the integrated device and topology information identifies the port that is available on the particular server and allows the client to communicate with the particular server via that available port. In another example, if data is to be stored on the system, the integration layer 270 utilizing the integrated device and topology information locates the storage devices that have the needed capacity and accordingly directs the data to be stored on the appropriate storage devices.

The package application layer 260 allows system administrators to develop user or custom applications utilizing the management functions which are available from the SMS layer 250.

As described above, management integration is achieved at the SMS layer 250 with the integration layer 270 as shown in FIG. 2. In an exemplary embodiment, the SMS layer is implemented as part of the GSM server 116. Referring to FIG. 1, device and topology information from each location, for example, locations A and B, is communicated to the GSM server 116 from the respective LSM servers 110. For example, at location A, LSM server 110 forwards the device and topology information with respect to IP server farm 112 and SAN 114 to GSM server 116. Using the device and topology information, the GSM server 116 can communicate with the respective LSM servers 110 to allow various network and storage management functions to be carried out.

In one exemplary embodiment, each LSM server 110 includes a number of modules that allow it to communicate with the GSM server 116 and carry out various network and storage management functions. These modules include a SNMP manager module, a management map creation module, a storage network topology information creation module, an IP storage configuration module, a FC configuration module, a RAID configuration module, and a HBA configuration module.

The SNMP manager module is responsible for carrying out various SNMP (simple network management protocol) functions, such as, handling SNMP packets and MIB (management information base) contents acquired from managed objects.

The management map creation module is responsible for managing various network or node mapping functions, such as, creating, storing and displaying the given topology information of a network or node. It should be noted that parts of this module may reside on the GSM server 116.

The storage network topology information creation module is responsible for creating and managing storage device specific network information. For example, network information that relates to specific protocols, such as, Fibre Channel and iSCSI, for different storage devices can be created and managed by this module.

The IP storage configuration module is responsible for managing information relating to IP storage configuration. For example, this module can be used to change or query IP storage configuration relating to a network or node.

The FC configuration module is responsible for managing information relating to FC (Fibre Channel) storage configuration. For example, this module can be used to change or query the FC storage configuration relating to a network or node.

The RAID configuration module is responsible for managing information relating to RAID (redundant arrays of inexpensive disks) device configuration. For example, this module can be used to change or query the RAID device configuration relating to a network or node.

The HBA configuration module is responsible for managing information relating to HBA (host bus adapter) device configuration. For example, this module can be used to change or query the HBA and client device configuration relating to a network or node.

Figure 3:
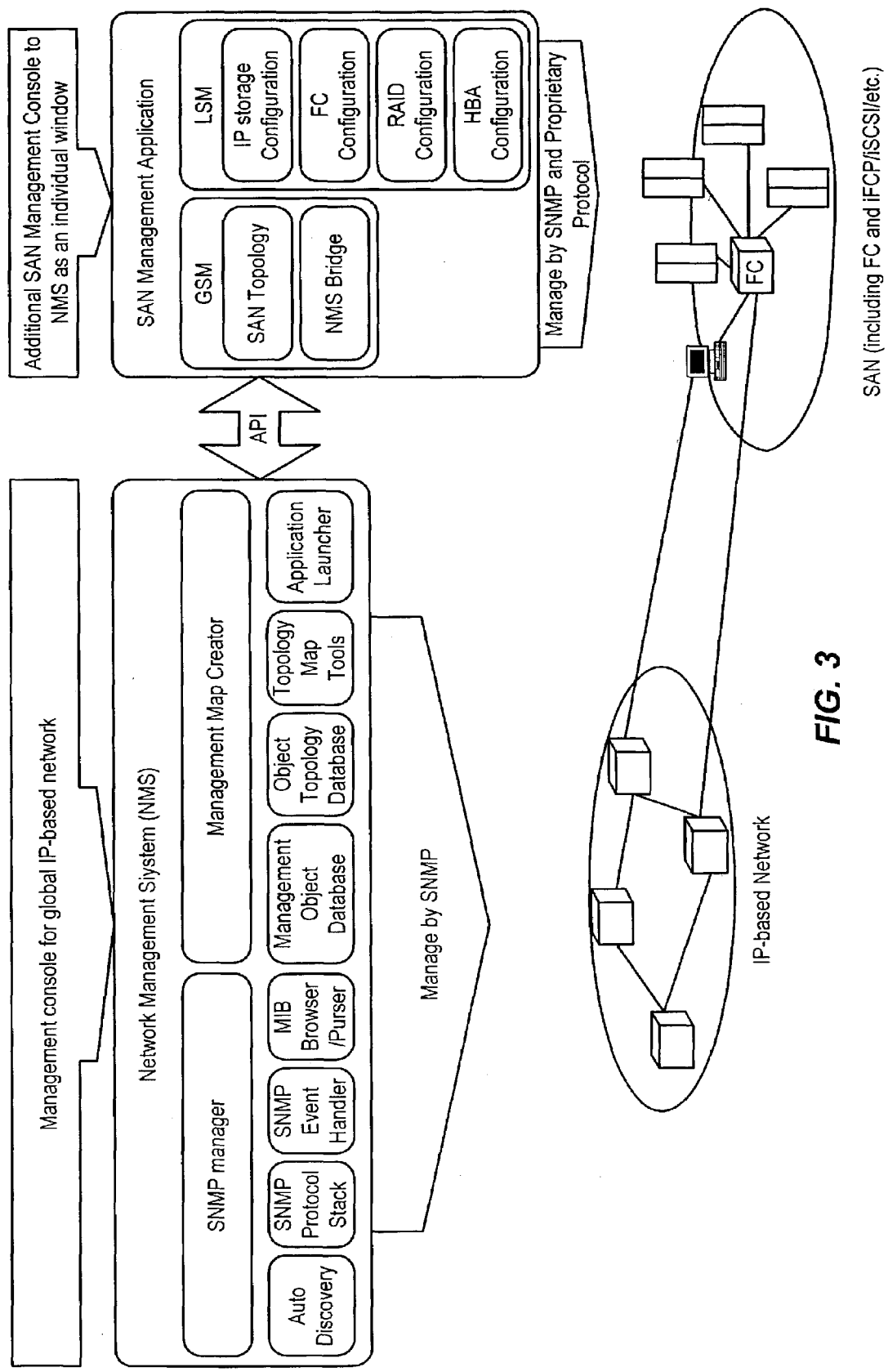
FIG. 3 is a simplified schematic diagram illustrating an exemplary embodiment of the integrated management tools in accordance with the present invention.

FIG. 3 illustrates an exemplary embodiment of the integrated management tools in accordance with the present invention. In this exemplary embodiment, the storage network management functionality of the integrated management tools is built or implemented as an application (hereinafter, storage network management application) that interacts with a network management system. It will be appreciated by a person of ordinary skill in the art that the network management system can be either a pre-existing system that is generally available or a system that is custom built to provide network management or a combination of both. Using the functionality of the network management system to implement the integrated management tools can help reduce the complexity and cost of the implementation process.

Referring to FIG. 3, the storage network management application of the integrated management tools is implemented using a number of modules. These modules include a SAN topology module, a NMS (network management system) bridge module, an IP storage configuration module, a FC configuration module, a RAID configuration module, and a HBA configuration module. It should be noted that since the storage network management application is implemented as an application that interacts with the network management system, the respective functionality of the SNMP manager module and the management map creation module are subsumed within the NMS bridge module. The SAN topology module corresponds to the storage network topology information creation module as described above. Finally, the IP storage configuration module, the FC configuration module, the RAID configuration module and the HBA configuration module as shown in FIG. 3 provide the same functionality as those described above. These modules are distributed between the GSM server 116 and each LSM server 110.

In the exemplary implementation shown in FIG. 3, the SAN topology module and the NMS bridge module reside on the GSM server 116 and the IP storage configuration module, the FC configuration module, the RAID configuration module, and the HBA configuration module reside on the LSM server 110. In addition, the storage network management application includes an application programmable interface (API) that can be used to communicate with various function blocks within the network management system, such as, SNMP event handler, MIB browser & purser, object topology database and topology map tools, etc.

Generally, the modules residing on the LSM server 110, as described above, provide the capability to allow the LSM server 110 to change or query the configuration of the storage or storage-related devices, such as, Fibre Channel switches, Host Bus Adapters (HBA) and IP storage drivers in the devices. The configuration or topology information may then be passed to the GSM server 116. The modules residing on the GSM server 116 may then, in turn, display such information in various manners for viewing and management purposes, as will be further discussed below.

Figure 4:
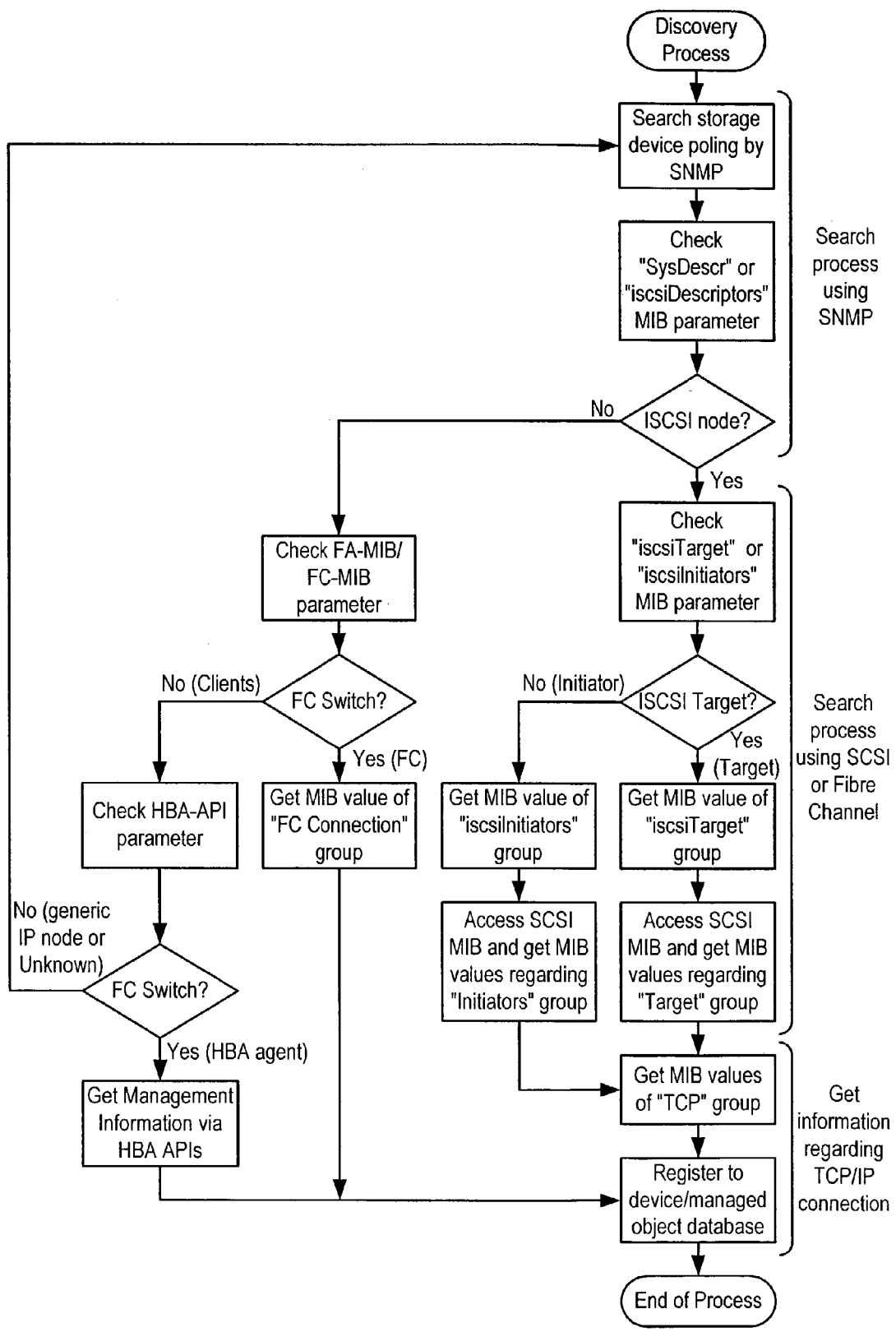
FIG. 4 is an exemplary flow diagram illustrating the discovery process for storage-related devices in accordance with the present invention.

In order for the integrated management tools to provide the functionality described above, all the managed devices within the system and their associated information need to be identified or discovered. More specifically, first, all the nodes within the system are polled and identified to determine whether a node is an IP network node or a storage network node. Once the initial identity of a node is identified, appropriate steps are taken to further determine what devices are within that node. For example, if it is determined that a node is a storage network node, then an additional check is performed to determine if that storage network node is a iSCSI node or a Fibre Channel node. Depending on the outcome of this determination, appropriate steps are taken to identify the devices or equipment within that node. Details of the discovery process are illustrated in FIG. 4. FIG. 4 is an exemplary flow diagram illustrating the discovery process for storage-related devices in accordance with the present invention. Based on the disclosure provided herein, a person of ordinary skill in the art will be able to carry out the discovery process in accordance with the present invention.

As described above, the LSM servers 110 collect respective device and topology information and forward such information to the GSM server 116. FIGS. 5A-C and 6A-G illustrate exemplary types of device and topology information that is forwarded by a LSM server 110 to the GSM server 116. In one exemplary implementation, the forwarded information is encoded in XML format. In turn, the GSM server 116 integrates all the device and topology information received from the LSM servers 110 and presents such integrated information for viewing and management purposes.

Figure 7:
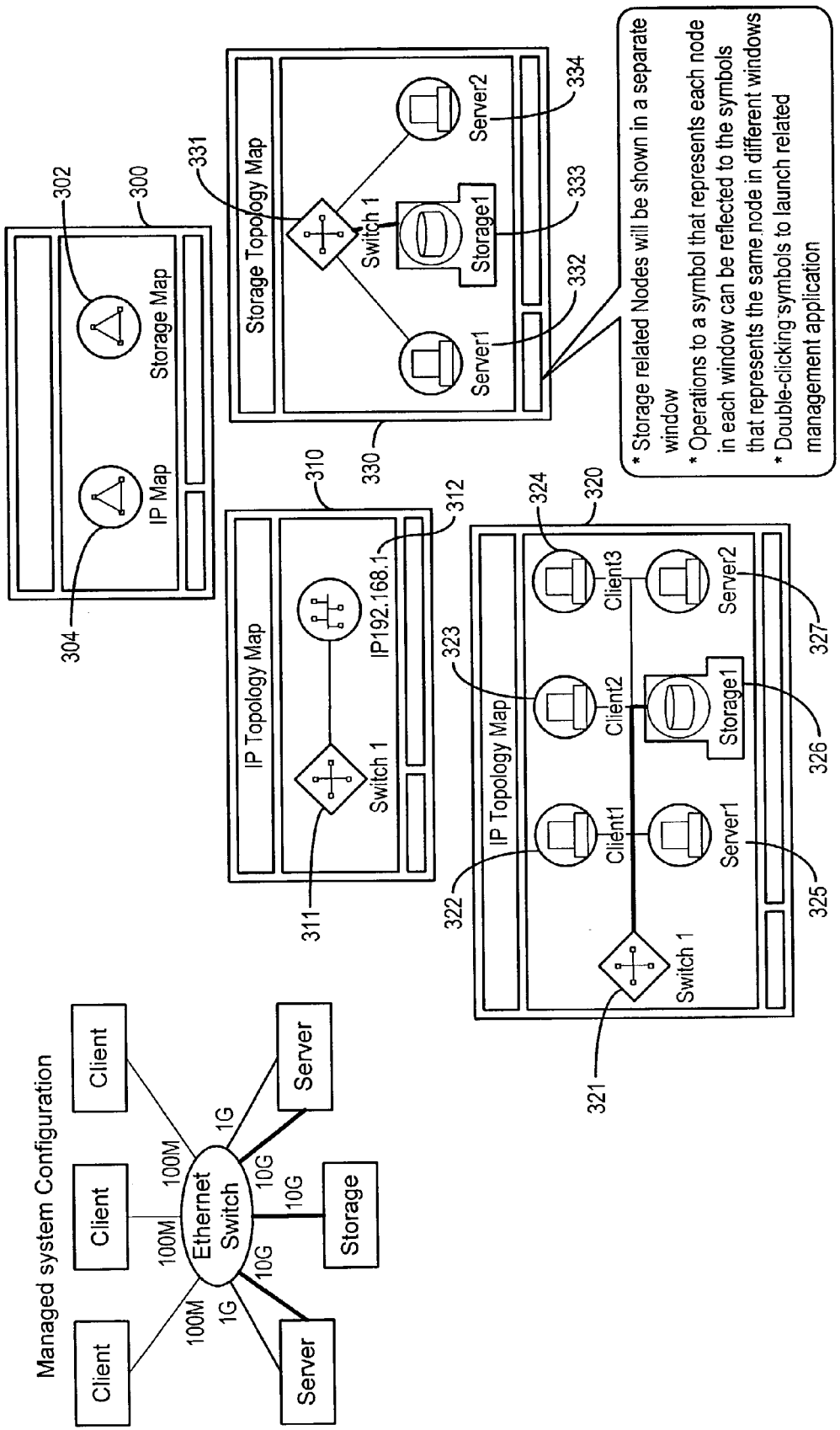
FIG. 7 is a simplified schematic diagram illustrating examples of a number of management windows and their respective transition process in accordance with the present invention.

FIG. 7 shows examples of a number of management windows and their respective transition process. In an exemplary aspect, these management windows are displayed in the management console screen for system administrators to manage the mixture of IP network nodes and storage network nodes. These management windows are typically accessed via the GSM server 116.

In one exemplary embodiment, IP network nodes and storage network nodes are shown respectively in separate windows. Elements within a node are represented by selectable symbols or icons. Within each window, operations performed on a symbol or icon that represents an element are accordingly reflected in the corresponding symbol or icon that represents the same element in a different window. In addition, double-clicking on a symbol or icon may launch related management application associated with the element represented by that symbol or icon.

For further illustration, referring to FIG. 7, there are two launch icons 302 and 304 at the top window 300. The two icons 302 and 304 respectively represent two topology maps of the IP network nodes and the storage network nodes within a system that is being managed. The two icons 302 and 304 can each be selected, for example, by clicking on the icon. Once an icon is selected, the corresponding topology map is expanded.

As shown in FIG. 7, if the icon 304 is selected, an IP network topology window 310 appears. The IP network topology window 310 includes two selectable icons 311 and 312 representing connection/switch information and IP address information, respectively. If icon 312 representing IP address information is selected, another window 320 appears showing the topology information in a graphical manner. In this example, it is shown that at the selected IP address, there are various icons representing different devices including three clients 322, 323 and 324, two servers 325 and 327, and one storage device 326. Although not illustrated, it should be understood that these various icons are also each selectable. If selected, each of these various icons may further display information relating to that device. For example, if the icon representing the storage device 326 is selected, device and topology information relating to that storage device 326 may be displayed including, for example, type of transport protocol used, type of storage device and storage capacity etc. In addition, depending on the specific design or application, selecting the icon may also allow one or more related management applications to be launched. For example, if the icon representing the storage device 326 is selected, in addition to displaying the device and topology information, an application may be launched allowing the storage device 326 to be re-configured.

If the icon 304 is selected, then a storage network topology window 330 appears. The storage network topology window 330 displays a number of icons representing different devices including two servers 332 and 334 and a storage device 333. In this case, it should be noted that the "Storage1" icon 326 in the IP network topology window 320 and the "Storage1" icon 333 in the storage network topology window 330 actually represent the same device in the system. Thus, operations to either icon 326 or 333 are immediately reflected to the other icon 326 or 333 since these icons 326 and 333 represent the same device in the system.

Figure 8:
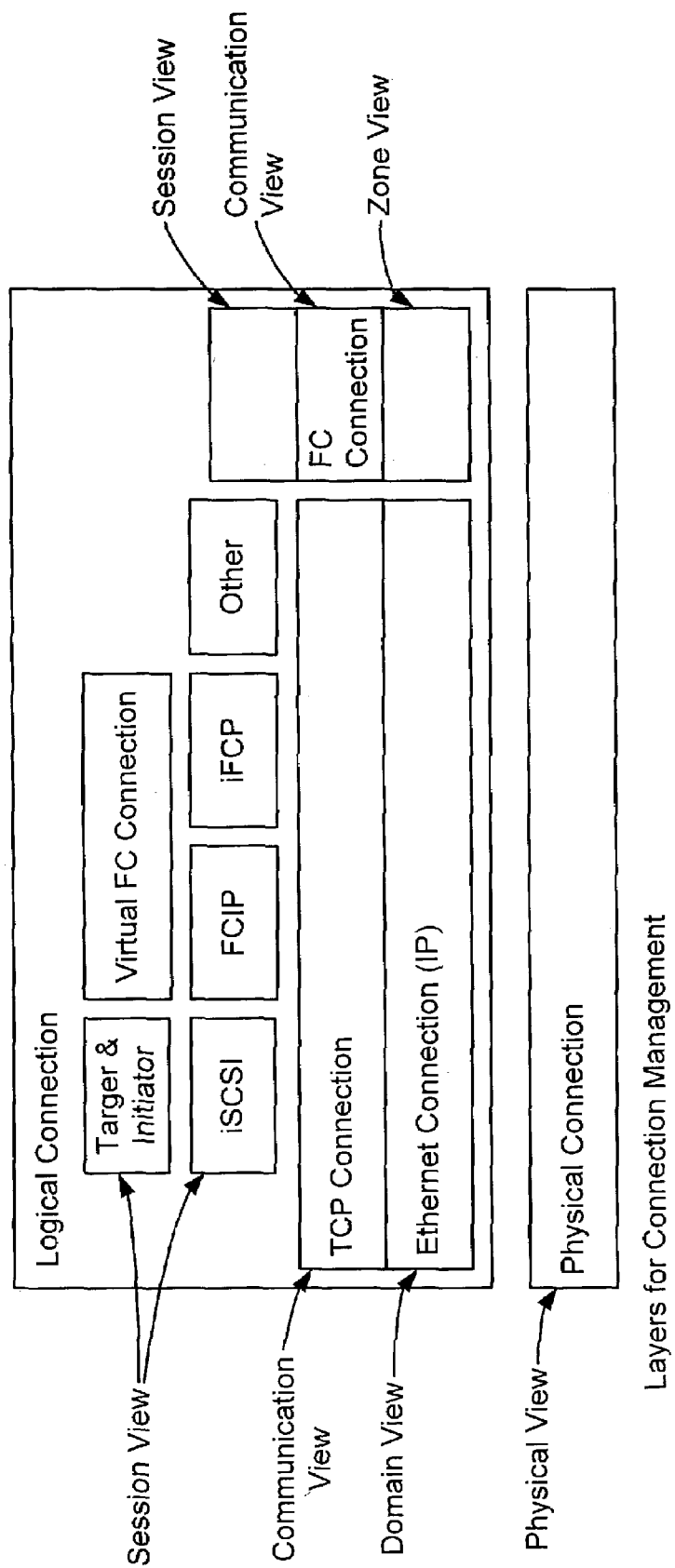
FIG. 8 is a simplified schematic diagram illustrating the different exemplary levels or layers for connection management in accordance with the present invention.

FIG. 8 illustrates various exemplary levels or layers of connection management applicable to the topology management window shown in FIG. 7. The SMS layer 250 is capable of handling and displaying information pertaining to many aspects of connection. In other words, connection or topology information for various connected devices can be displayed in various alternative manners by the SMS layer 250 depending on the choice of the viewer. Referring to FIG. 8, there are four exemplary levels or layers for connection management. The first level named "physical connection" is used for managing the physical connections, such as, cabling, between devices. The other levels are categorized as "logical connection." Since there are many different logical entities or protocols that control a connection, the "logical connection" category has some additional levels of connections as shown in FIG. 8.

Information relating to the various levels is available for display through various corresponding views. These views include a physical view, a domain or zone view, a communication view and a session view.

The physical connection view is used to display information relating to the physical connections amongst the devices.

The zone view and the domain view both display logical connectivity between nodes according to the logical configuration of switch devices or router devices. The zone view is used when the connected devices are in a storage network node; likewise, the domain view is used when the connected devices are in an IP network node. Some switch or router devices have capabilities that restrict the delivery of broadcast communication in accordance with the associated switching policy residing in the devices. For example, an Ethernet switch that has VLAN capability restricts the packet transport within switching ports allowed by the VLAN configuration or VLAN policy. As a result of this restriction, the zone view and the domain view may show the subset of the whole network even if the all the devices are connected to each other.

The next level of the logical connection is the communication view. The communication view displays TCP level connection capabilities between network nodes. In this view, all the nodes and possible pair for communication can be shown, where a communication session is not necessarily currently active.

Another level of logical connection is the session view. The session view may provide some windows displaying topology regarding specific target protocol or logical connection, such as, an iSCSI session. In this view, only the active communication session between nodes is shown or highlighted.

Figure 9:
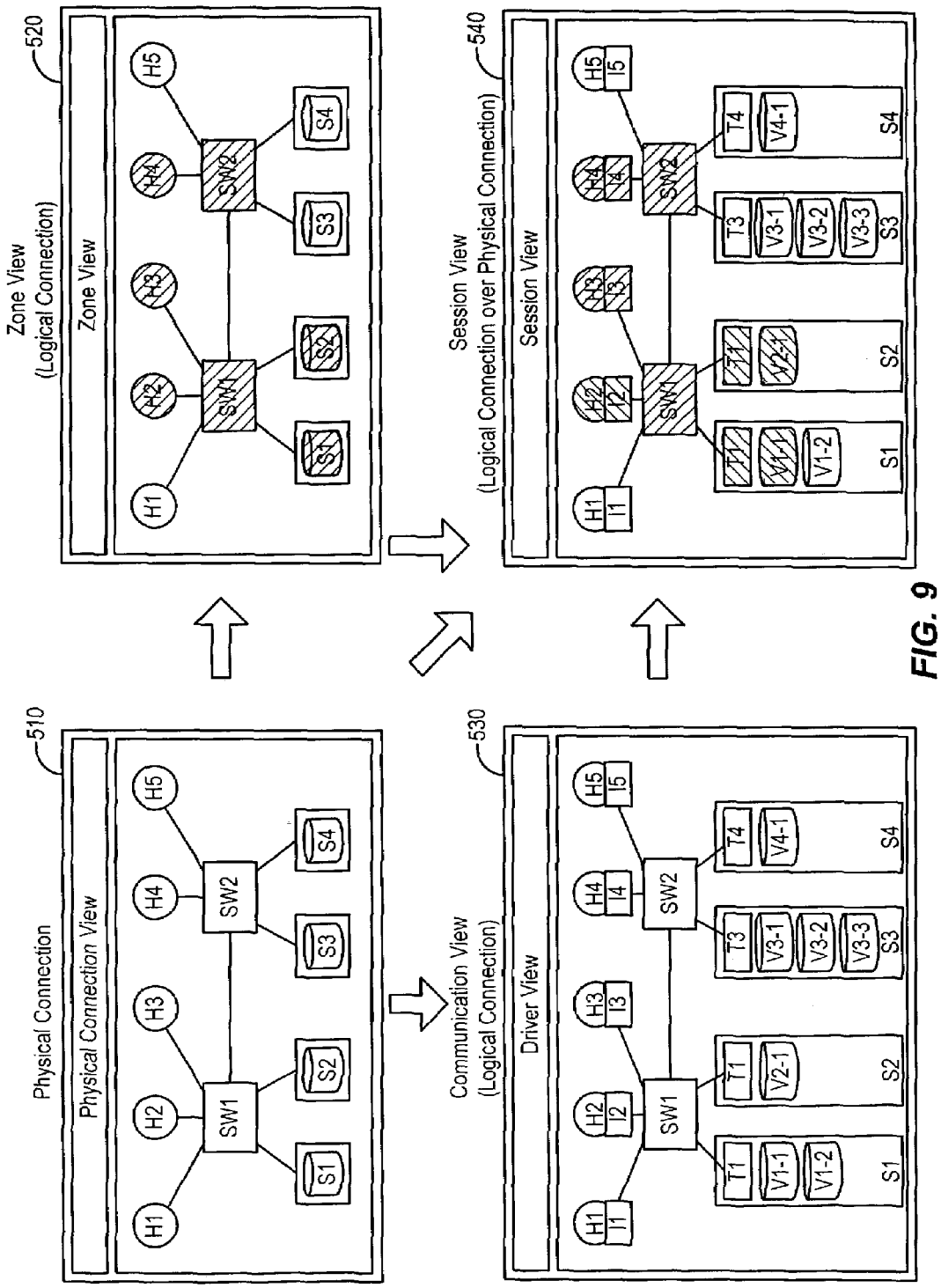
FIG. 9 is a simplified schematic diagram illustrating the various exemplary views of the different levels or layers for connection management as shown in FIG. 7.

FIG. 9 illustrates the various exemplary views of the different levels or layers for connection management as shown in FIG. 8. It should be noted that FIG. 9 is merely another example of the transition process of multiple windows for managing an entire system based on topology information. In this example, the system includes a series of physical connections between network node devices including both IP network nodes and storage network nodes, such as, Fibre Channel nodes.

Referring to FIG. 9, the physical connection view window 510 shows the devices within the administrative domain of the system and the existing physical connections interconnecting the devices. The existing physical connections may include, for example, optical fiber link and copper link etc. Depending on the specific design and application, the multiple connections between the same devices can be aggregated. In this example, it is shown that three clients H1, H2 and H3 and two storage devices S1 and S2 are connected to a switch SW1; two clients H4 and H5 and two storage devices S3 and S4 are connected to a switch SW2; and switch SW1 is connected to switch SW2.

From the physical connection view window 510, a transition can be made to the zone view window 520. The zone view window 520 is used to show and highlight the sub-network nodes that are categorized based on IP switch or Fiber Channel switch devices. This represents one perspective of a type of logical connection within the physical connection according to the configuration of the devices in the system. As shown in the zone view window 520, the zone divided by switches SW1 and SW2 is shown as hatched device icons.

From the physical connection view window 510, a transition can also be made to the communication view window 530. The communication view window represents another logical connection perspective. The communication view window 530 is used to show the availability and capability of the logical connections interconnecting the devices. In this window 530, logical entities within the devices, such as, device driver software can also be shown as a part of the device icons. For example, various logical entities respectively associated with clients H1-H5 are shown as I1-I5 in the communication view window 530.

A transition can further be made from the physical connection view window 510 to the session view window 540. The session view window 540 represents a perspective based on a combination of logical and physical connections. For example, a logical connection can be mapped over the physical connections. In the session view window 540, sessions between the devices are shown as a combination of highlighted icons. This window 540 can be used to indicate how many sessions are active and what device pairs actually communicate with each other.

Figure 10:
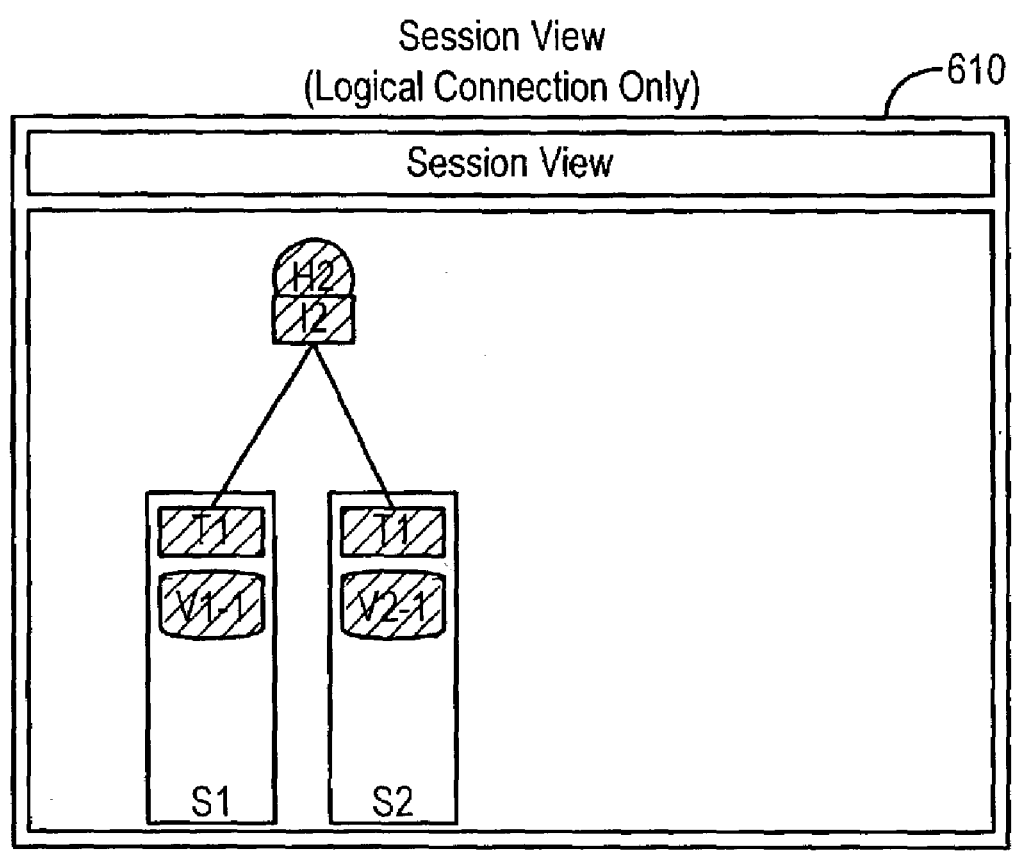
FIG. 10 is a simplified schematic diagram illustrating another exemplary view of a session view window as shown in FIG. 7.

FIG. 10 illustrates another exemplary view of the session view window 540 as shown in FIG. 9. In this view window 610, only a session selected for viewing is shown and only the logical devices related to the selected session are displayed. The physical connections, such as, the switches that physically connect the logical devices in a selected session are not displayed. When comparing this view window 610 with the session view window 540 in FIG. 9, it can be seen the physical connection, switch SW1, is not shown; only the logical devices in the selected session, i.e., client H2 and storage devices S1 and S2 are shown.

It should be understood that the present invention as described herein can be implemented in software, in a modular or integrated manner, hardware or a combination of both. Based on the disclosure and teachings provided herein, a person of ordinary skill in the art will know of ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for managing a plurality of internet protocol network functions and a plurality of storage area network functions comprising:

a local storage management server configured to collect device and topology information from a plurality of devices being managed by the local storage management server, the plurality of devices including a plurality of internet protocol network elements and a plurality of storage elements; and a global storage management server configured to receive the device and topology information from the local storage management server and display the device and topology information for viewing and management purposes, the device and topology information being displayed by the global storage management server in at least:

a physical connection view which displays only information relating to physical connections among the internet protocol network elements and the plurality of storage elements;

a domain view which displays only information relating to logical connections interconnecting selected ones of the plurality of internet protocol network elements;

a zone view which displays only information relating to a logical connection interconnecting selected ones of the plurality of storage elements;

a communication view which displays only information about TCP connections between pairs of internet protocol network elements and storage elements, wherein a TCP connections is a connection between two elements tat communicate using TCP; and a session view which displays only information about internet protocol network elements and storage elements that have ongoing communications activity, wherein the local storage management server communicates with the global storage management server to forward the device and topology information via a computer network, wherein the internet protocol network elements are exclusive of the storage elements, wherein the storage elements are exclusive of the internet protocol network elements.

2. The system of claim 1 wherein by using the device and topology information, a user via the global storage management server is able to direct the local storage management server to manage one of the plurality of devices in either of the internet protocol network elements or the storage elements.

3. The system of claim 1 wherein the internet protocol network functions using internet protocol based communications, and the storage are a network functions using at least one of Fibre Channel and SCSI based protocol communications.

4. The system of claim 3 wherein a management application designed to manage at least one of the plurality of devices is capable of being launched from at least one of the plurality of views.

5. The system of claim 3 wherein the plurality of views includes a physical connection view; and wherein the physical connection view displays information relating to physical connections interconnecting selected ones of the plurality of devices.

6. The system of claim 1 wherein the plurality of views includes a communication view; and wherein the communication view displays information relating to possible communication session connections between pairs of devices.

7. The system of claim 1 wherein the plurality of views includes a session view; and wherein the session view displays information relating to currently active sessions between pairs of devices.

8. The system of claim 1 wherein the plurality of network elements includes a server farm.

9. The system of claim 1 wherein the plurality of storage elements includes a storage area network.

10. The system of claim 1 wherein the plurality of storage elements includes a RAID.

11. An integrated management system for managing a plurality of internet protocol network and storage network functions within a computer system, comprising:

a plurality of nodes, each node having a local storage management server configured to manage a plurality of devices within that node and collect device and topology information from the plurality of devices, the plurality of devices including a plurality of network elements communicating using an internet protocol and a plurality of storage area network elements communicating using at least one of a Fibre Channel based protocol or a SCSI based protocol, wherein the network elements do not include the storage area network elements; and a global storage management server configured to receive the device and topology information from each node and integrate and display the received device and topology information for viewing and management purposes, wherein the integrated device and topology information is capable of being displayed by the global storage management server in a plurality of views;

wherein the plurality of views includes:

a physical connection view which displays only information relating to physical connections among the internet protocol network elements and the plurality of storage elements;

a domain view which displays only information relating to logical connections interconnecting selected ones of the plurality of internet protocol network elements;

a zone view which displays only information relating to a logical connection interconnecting selected ones of the plurality of storage elements;

a communication view which displays only information about TCP connections between pairs of internet protocol network elements and storage elements, wherein a TCP connections is a connection between two elements that communicate using TCP; and a session view which displays only information about internet protocol network elements and storage elements that have ongoing communications activity;

wherein nodes are polled to determine whether each node polled is a storage network node or an internet protocol network node, and each node communicates with the global storage management server to forward the device and topology information via a computer network.

12. The system of claim 11 wherein by using the integrated device and topology information, a user via the global storage management server is able to direct a local storage management server associated with a desired node to manage one of the plurality of devices within that node.

13. The system of claim 11 wherein a management application designed to manage at least one of the plurality of devices within a node is capable of being launched from at least one of the plurality of views.

14. The system of claim 11 wherein the plurality of views includes a physical connection view; and wherein the physical connection view displays information relating to physical connections interconnecting selected ones of the plurality of devices within a node.

15. The system of claim 11 wherein the plurality of views includes a communication view; and wherein the communication view displays information relating to possible communication session connections between pairs of devices within a node.

16. The system of claim 11 wherein the plurality of views includes a session view; and wherein the session view displays information relating to currently active sessions between pairs of devices within a node.

17. The system of claim 11 wherein the plurality of network elements includes a server farm.

18. The system of claim 11 wherein the plurality of storage elements includes a storage area network.

19. The system of claim 11 wherein the plurality of storage devices includes a RAID.

20. A storage network management application on a computer readable medium designed to function in cooperation with a internet protocol network management system having a plurality of network management functions, comprising:

an internet protocol network management system bridge module configured to provide a plurality of SNMP functions and network mapping functions to manage a plurality of network elements;

a storage network topology information creation module configured to collect and manage network topology information relating to a plurality of storage elements, the network elements being elements different from the storage elements, wherein the network topology information is capable of being displayed by the global storage management server in a plurality of views;

wherein the plurality of views includes:

a physical connection view which displays only information relating to physical connections among the internet protocol network elements and the plurality of storage elements;

a domain view which displays only information relating to logical connections interconnecting selected ones of the plurality of internet protocol network elements;

a zone view which displays only information relating to a logical connection interconnecting selected ones of the plurality of storage elements;

a communication view which displays only information about TCP connections between pairs of internet protocol network elements and storage elements, wherein a TCP connection is a connection between two elements that communicate using TCP; and a session view which displays only information about internet protocol network elements and storage elements that have ongoing communications activity;

a plurality of configuration modules, each capable of being invoked to manage a storage element based on the network topology information, the plurality of configuration modules including:

an IP storage configuration module configured to manage information relating to storage configuration;

a Fibre Channel (FC) configuration module configured to manage information relating to Fibre Channel storage configuration;

a redundant array of independent disks (RAID) configuration module configured to manage information relating to RAID device configuration; and a host bus adapter (HBA) configuration module configured to manage information relating to HBA device configuration;

a local storage management server having resided thereon the IP storage configuration module, the FC configuration module, the RAID configuration module and the HBA configuration module; and a global storage management server having resided thereon the network management system bridge module and the storage network topology information creation module;

wherein the local storage management server is located within a node, the node further including the plurality of network elements and storage elements; and wherein the network topology information is forwarded by the local storage management server to the global storage management server for viewing and management purposes.

21. The storage network management application of claim 20 further comprising: an application programmable interface configured to interact with the network management system in order to utilize the plurality of network management functions.

22. The storage network management application of claim 20 wherein by using the network topology information, the user via the global storage management server is able to direct the local storage management server to manage one of the plurality of network elements and storage elements.

23. A method for managing a plurality of nodes within a computer system, each of the plurality of nodes having a plurality of devices including a plurality of internet protocol network elements and a plurality of storage area network elements, the internet protocol network elements being exclusive of the storage area network elements, the method comprising:

having a local storage management server at each node to collect device and topology information from the plurality of devices within that node, at least some of the device and topology information including elements from the internet protocol network elements and the storage area network elements;

forwarding the device and topology information from each node to a global storage management server;

directing the global storage management server to integrate the device and topology information forwarded from each node;

directing the global storage management server to display the integrated device and topology information for viewing and management purposes; and directing the global storage management server to display the integrated device and topology information in a plurality of views on a display device, wherein the plurality of views includes:

a physical connection view which displays only information relating to physical connections among the internet protocol network elements and the plurality of storage elements;

a domain view which displays only information relating to logical connections interconnecting selected ones of the plurality of internet protocol network elements;

a zone view which displays only information relating to a logical connection interconnecting selected ones of the plurality of storage elements;

a communication view which displays only information about TCP connections between pairs of internet protocol network elements and storage elements, wherein a TCP connection is a connection between two elements that communicate using TCP; and a session view which displays only information about internet protocol network elements and storage elements that have ongoing communications activity.

24. The method of claim 23 further comprising:
permitting a user to view the intergrated device and topology information; and
permitting the user to use global storage management server to direct a local storage management server associated with a desired node to manage one of the plurality of devices within that node based on the integrated device and topology information.

25. The method of claim 23 further comprising:
launching a management application designed to manage at least one of the plurality of devices within a node from at least one of the plurality of views.

26. The method of claim 23 wherein the plurality of views includes a physical connection view; and
wherein the physical connection view displays information relating to physical connections interconnecting selected ones of the plurality of devices within a node.

27. The method of claim 23 wherein the plurality of views includes a communication view; and
wherein the communication view displays information relating to possible communication session connections between pairs of devices within a node.

28. The method of claim 23 wherein the plurality of views includes a session view; and
wherein the session view displays information relating to currently active sessions between pairs of devices within a node.

29. The method of claim 23 wherein the plurality of network elements includes a server farm.

30. The method of claim 23 wherein the plurality of storage elements includes a storage area network.

31. The method of claim 23 wherein the plurality of storage devices includes a RAID.

* * * * *